March 17, 1953 E. S. MILLER 2,631,725

MOTION-PICTURE FILM REEL CASE

Filed July 9, 1947

INVENTOR.
Ellsworth S. Miller
BY
A. C. Wilson
ATTORNEY.

Patented Mar. 17, 1953

2,631,725

UNITED STATES PATENT OFFICE 2,631,725

MOTION-PICTURE FILM REEL CASE

Ellsworth S. Miller, Detroit, Mich.

Application July 9, 1947, Serial No. 759,774

6 Claims. (Cl. 206—65)

This invention relates to the motion picture industry, and more particularly to an improved case for transporting film in such a manner that the possibility of damaging the reel or film is minimized.

In the operation of projection equipment, it is necessary that the film be accurately guided in such a manner that it can flow into the projector at a substantially constant speed. Projection reels having relatively accurately aligned flanges are therefore generally employed to insure that the film runs true and is not damaged by scraping against the reel flanges as it flows into the projector.

It has been customary to employ relatively cheap shipping reels to transport film from one theatre to another, and to pack the film in cases or containers in such a manner that the edge of the reel contacted the inner surface of the container to support the film and reel when the case is so positioned that the reel is disposed vertically.

The majority of shipping reels being used are designed to carry approximately two thousand feet of film weighing approximately 12 pounds and corresponding with approximately twenty-two minutes of projection time. In order to supply sufficient film to run the average three hour show it is therefore necessary to employ eight or more shipping reels.

If the shipping reel carrying case is dropped or jolted about in transit the flanges of the shipping reels are subjected to the full weight of the film or approximately 12 pounds. The flanges of the shipping reels are therefor frequently crushed or bent, and oftentimes the edges of the film having regularly spaced apertures to receive the film sprocket driving teeth are injured by the flanges of the reels. Efforts have been made to overcome these difficulties by the use of resilient plugs or liners surrounding the reels and film, but such efforts have not proved very satisfactory due to the high loads to which the flanges of the reels are subjected in supporting the entire load of the film.

Before the film can be projected it must be rewound onto the projection reels, and be again rewound onto the shipping reels at the completion of the run in a particular theatre before being transported to another theatre. It frequently happens that with the reels now being used it is necessary under certain conditions to rewind the film several times in order to position it with the beginning of the film out at the time it is projected in each theatre, and to transfer it from projection reels to shipping reels, and to permit inspection of the film at the film exchange before it is forwarded to each theatre where it is to be projected.

In my Patent Number 2,220,610 issued November 5, 1940, I have disclosed a film reel mounting wherein the reel is provided with a splined hub adapted to engage a splined shaft of relatively large diameter, and wherein means are provided to maintain the reel in a predetermined axial position on the shaft. With this mounting the reel is securely supported on a relatively large diameter splined shaft in such a manner that it is restrained from substantial movement axially or rotationally relative to the shaft.

An object of this invention is to provide an improved shipping case for transporting film in such a manner that the film reel is securely supported at the hub of the reel whereby the outer flanges of the reel do not engage the inner surface of the shipping case.

A further object of the invention resides in the provision of a film carrying case having a centrally disposed supporting member for receiving a film reel hub to support the reel in the case in such a manner that the weight of the film and reel is transmitted to the case through the central supporting member.

Another object of the invention is to provide a novel film carrying case wherein the hubs of film reels are supported in such a manner that the outer edges of the reel flanges are maintained out of contact with the carrying case to prevent injury to the reel or film in the event the case is dropped or jolted.

Yet a still further object resides in the provision of an improved method of transporting film whereby a plurality of film carrying reels positioned in a single case are restrained from substantial axial or rotational movement in such a manner that the outer edges of the reels are spaced from the case to protect the reels and film from injury during shipment.

A further object is to provide an improved film shipping case wherein the weight of the film on the reels is transmitted to the case through the hub of the reel, and the outer edges of film flanges are not subjected to load thereby virtually eliminating the possibility of injuring the reels during shipping whereby the same reel may be used for both shipping and projection.

Still another object of the invention resides in the provision of an improved case for transporting film on reels in such a manner that the possibility of injuring the reel in transit is substantially eliminated thereby making it feasible to use the same reels for both shipping and projection and eliminating the necessity for rewinding the film before and after it is run in a theatre.

Yet a further object of the invention is to provide an improved method of transporting and projecting film whereby the film is projected from the same reel as it is transported on thereby eliminating the necessity of rewinding the film, the film being reversed on the reel at the time it is inspected at the film exchange.

Other objects of this invention will appear in the following description and appended claims, reference being had to the accompanying drawing forming a part of this specification, wherein like reference characters designate corresponding parts in the several views.

Figure 1:
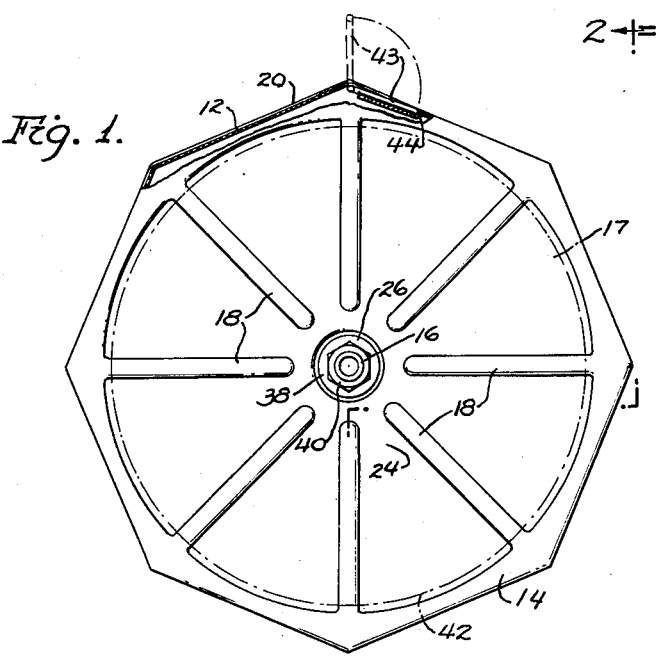
Fig. 1 is a plan view partly in section of a film reel shipping case embodying my invention.
Figure 2:
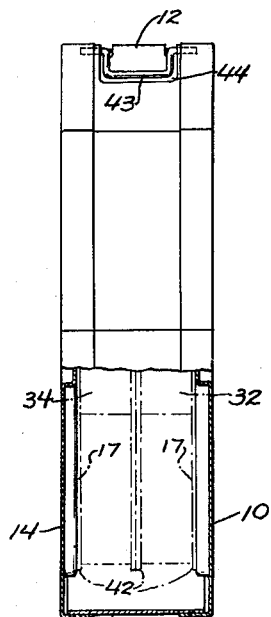
Fig. 2 is a sectional view, partly in elevation taken substantially on the line 2—2 of Fig. 1 looking in the direction of the arrows.
Figure 3:
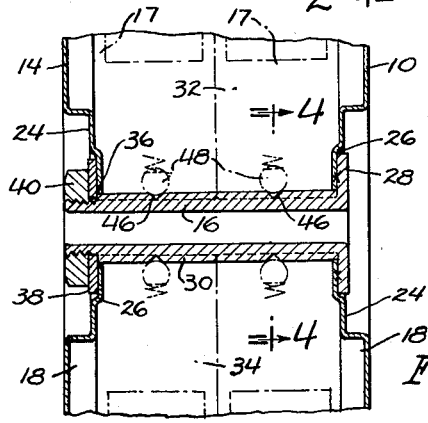
Fig. 3 is an enlarged fragmentary sectional view of the film reel supporting member.
Figure 4:
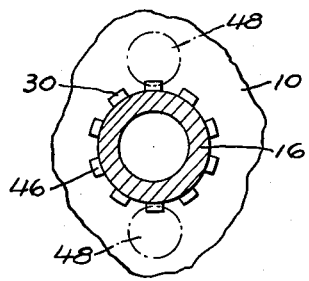
Fig. 4 is a fragmentary sectional view taken substantially on the line 4—4 of Fig. 3, looking in the direction of the arrows.

Referring now more particularly to Figs. 1 and 2 it will be noted that the essential elements of my invention are illustrated as embodied in a film reel carrying case having bottom, side and top closure 10, 12 and 14 respectively, and a centrally disposed film reel supporting member 16.

The specific form of these elements may vary widely, but I have illustrated them as applied to a case to receive the film reel and mounting 17 of the type disclosed in my Patent Number 2,220,610, issued November 5, 1940.

The bottom and top closures 10 and 14 are symmetrical, and are illustrated as being of octagonal shape but it will be apparent that any other desired shape may be used. The closures 10 and 14 have radially extending rigidifying corrugations 18, and inwardly extending boundary flanges 20 and 22 adapted to overlie and engage the side closure member 12, the flanges 20 of the bottom closure being permanently secured to the side closure member 12 in any convenient manner as by welding or riveting.

The central portions of the bottom and top closures 10 and 14 are illustrated as being contoured with two radially spaced steps 24 and 26 to cooperate with the corrugations 18 to provide a more rigid construction and to house the means for securing the reel supporting member 16 in the bottom and top closures 10 and 14 respectively.

The central supporting member 16 may be secured to the bottom closure 10 in any suitable manner. In the embodiment illustrated the member 16 has a radially extended flange 28 to underlie the inner step 26 of the bottom closure 10 to be secured thereto as by welding or riveting.

The supporting member 16 may be of any desired shape such as round or may be contoured to receive whatever shaped bore is employed in the hub of the film reels to be accommodated. The member 16 is illustrated as having external splines 30 to receive the splined hubs 32 and 34 of film reels 17 of the type disclosed in my aforementioned patent.

The free end of the supporting member 16 projects perpendicularly from the bottom closure 10, and is substantially centrally disposed with reference to the side closures 12. The reels 17 having film wrapped thereon are projected over the member 16, the splined hubs 32 and 34 of spaced reels 17 engaging the splines 30 on the supporting member 16, and the radial flange of the reel positioned adjacent the bottom closure 10 contacting the surface of said closure or the radially extended corrugations 18 thereof, and the adjacent flanges of successively spaced reels engaging each other.

When the desired number of reels 17 have been placed in the case the top closure 14 is positioned in place, the supporting member 16 projecting through a centrally disposed aperture 36 in the top closure 14 to support the free or outer end of the member 16 and transmit the load of the reels and film through the top closure 14 to the side closures 12.

A washer 38 preferably of substantially the same diameter as the flange 28 carried by the supporting member 16 and secured to the inner step 26 of the bottom closure 10 may be secured to the inner step 26 of the top closure 14 in any convenient manner as by welding or riveting to strengthen the top closure 14 and provide a more substantial support for the member 16. A nut 40 may be threaded on the member 16 to clamp the top closure 14 firmly in place.

The weight of the film and reels 17 is thus carried by the supporting member 16 and is transmitted to the side closures 12 when the case is placed on the side members through the bottom and top closures 10 and 14. It will be noted that the outer ends 42 of the reels 17 are spaced from the side closures 12 of the case, and that the weight of the film and the reels is supported entirely through the rigidified bottom and top closures 10 and 14. In the event that the case is dropped or jolted in transit the flanges of the reels are not subjected to the weight of the film and the reels are spaced from the side closures, whereupon the flanges of the reels are protected from injury.

It will be apparent that my improved film carrying case can be made in different sizes to accommodate any desired number of reels. The bottom and top closures 10 and 14 may be symmetrical so that only a single set of dies is necessary to form both closures. Side closures 12 of sufficient width to accommodate a desired number of reels may be employed, the same bottom and top closures being used with all of the different sizes of cases. Cases to accommodate one to seven or more reels may thus be economically formed. The side closures 12 may, of course, be secured to the bottom closure 10 in any convenient manner as by welding, riveting or in any other desired manner.

A handle 43 may be pivotally mounted on the side closures 12 to facilitate carrying of the case, a segment of the side closure 12 being deformed inwardly as illustrated at 44 to permit the handle to occupy a position flush with the outer surface of the side closure.

The film reel supporting member 16 may be grooved circumferentially as illustrated at 46 to receive locking balls 48 or other retaining means similar to those disclosed in my Patent Number 2,220,610 to restrain the reels 17 from shifting axially on the supporting member 16.

Figure 5:
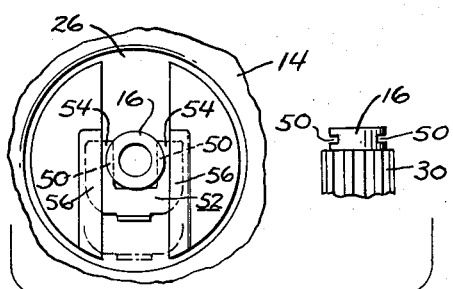
Fig. 5 is a fragmentary elevational view illustrating a somewhat modified form of the invention.

Fig. 5 illustrates a modified type of clamping mechanism for securing the top closure 14 to the supporting member 16 and the side closures 12. In this embodiment of the invention the member 16 is provided with spaced parallel grooves 50 to receive a slide 52 having a pair of spaced arms 54 to project into the grooves 50 of the member 16 to lock the top closure 14 in place, the slide 52 being secured to the top closure 14 by a pair of spaced plates 56 secured to the top closure 14. It will of course be apparent that any suitable fastening means may be employed to retain the top closure member 14 in place, preferably a fastening device that does not have loose pieces that can be lost or misplaced.

I claim:

1. In combination with a plurality of superposed film reels each having an apertured hub, a shipping case comprising a central supporting member adapted to project through the film reel hubs, a bottom closure member secured to said central supporting member, a top closure member detachably secured to said central supporting member, and side closure means interposed between the bottom and top closure members outside of the boundary of and out of contact with film reels mounted on said supporting member.

2. In combination with a plurality of superposed film reels each having a hub and radially extended flanges, a shipping case for said film reels comprising a container having spaced end walls and side walls positioned radially beyond and out of contact with the flanges of the film reels positioned therein, a central member adapted to be secured to one of said spaced end walls to project through the hubs of the film reels positioned therein to maintain the reel flanges in spaced relation relative to the side walls, and fastening means to secure the other end wall in a predetermined relation to the central member.

3. In combination with a film reel having a central apertured hub and radially extending axially spaced flanges, a case for said reel comprising a closure having bottom and side walls, a central supporting member secured to the bottom wall to project through the apertured hub of the film reel to support the film reel with its flanges spaced radially inwardly from and out of contact with the side walls, and an apertured top wall adapted to receive the central supporting member and engage the side walls.

4. In combination with a plurality of film reels each having an apertured hub and radially extended flanges, a shipping case for said reels comprising spaced bottom and top closure members having radially extended rigidifying corrugations, a film reel hub supporting member adapted to be permanently secured to the bottom closure member and to be releasably secured to the top closure member, the bottom and top closure members being contoured inwardly adjacent their connection to the hub supporting member to receive the connection to the hub supporting member and provide substantially flat bottom and top closure members, and side walls interposed between the bottom and top closure members, the side walls being spaced outside of the film reel flanges in such a manner that the film reels do not contact the side walls.

5. In combination with a plurality of film reels having apertured centrally disposed hubs and radial flanges, a case for said reels comprising bottom and top closure members, a centrally disposed film reel supporting member fixed to the bottom closure member to project through the apertured hubs of film reels, means to attach the top closure member to the film reel supporting member, and side wall means interposed between the bottom and top closure members, the side wall means being spaced beyond and out of contact with the radial flanges of the film reels.

6. In combination with a plurality of superposed film reels, a case for said articles comprising bottom and side and top closure members, a centrally disposed supporting member associated with the bottom closure member to project through the centrally apertured film reels and be detachably connected to the top closure member to maintain the marginal edges of said reels out of contact with the side closure members.

ELLSWORTH S. MILLER.

REFERENCES CITED

The following references are of record in the file of this patent:

UNITED STATES PATENTS

| Number | Name | Date |
|---|---|---|
| 1,047,653 | Killion | Dec. 17, 1912 |
| 1,252,204 | Valeri | Jan. 1, 1918 |
| 1,365,659 | Carter | Jan. 18, 1921 |
| 1,926,588 | Hayden | Sept. 12, 1933 |